(12) United States Patent
Caillon et al.

(10) Patent No.: US 7,978,878 B2
(45) Date of Patent: Jul. 12, 2011

(54) METHOD OF PROCESSING POSTAL ITEMS USING A SEPARATOR REPRESENTING A REGION OF INTEREST (ROI)

(75) Inventors: Christophe Caillon, Bretigny sur Orge (FR); Jacques Petit, Bourg les Valence (FR)

(73) Assignee: Solystic, Gentilly Cedex (FR)

( * ) Notice: Subject to any disclaimer, the term of this patent is extended or adjusted under 35 U.S.C. 154(b) by 949 days.

(21) Appl. No.: 11/910,873

(22) PCT Filed: Jun. 29, 2007

(86) PCT No.: PCT/FR2007/051562
§ 371 (c)(1),
(2), (4) Date: Oct. 5, 2007

(87) PCT Pub. No.: WO2008/043924
PCT Pub. Date: Apr. 17, 2008

(65) Prior Publication Data
US 2009/0141934 A1    Jun. 4, 2009

(30) Foreign Application Priority Data

Oct. 12, 2006  (FR) .................... 06 54225

(51) Int. Cl.
*G06K 9/00*  (2006.01)
(52) U.S. Cl. ...................... 382/101; 209/584
(58) Field of Classification Search .......... 382/100, 382/101, 112; 209/584, 900; 705/406
See application file for complete search history.

(56) References Cited

U.S. PATENT DOCUMENTS

| 4,205,780 | A |   | 6/1980  | Burns et al. |
| 5,460,273 | A | * | 10/1995 | Stevens et al. ............. 209/584 |
| 5,581,628 | A |   | 12/1996 | Nakamura et al. |
| 6,303,889 | B1 | * | 10/2001 | Hayduchok et al. ......... 209/584 |
| 6,539,098 | B1 | * | 3/2003  | Baker et al. ................. 382/101 |
| 6,819,777 | B2 | * | 11/2004 | Baker et al. ................. 382/101 |
| 6,994,220 | B2 | * | 2/2006  | Schererz et al. ............ 209/539 |
| 2006/0080266 | A1 | * | 4/2006 | Kiani et al. ................. 705/402 |

FOREIGN PATENT DOCUMENTS

| DE | 100 37 756 C1  | 11/2001 |
| EP | 0 034 941 A1   | 9/1981  |
| EP | 0 096 178 A2   | 12/1983 |
| EP | 0 596 724 A1   | 5/1994  |
| EP | 0 938066 A2    | 8/1999  |
| FR | 2 841 673 A1   | 1/2004  |
| WO | WO 01/86581 A1 | 11/2001 |

* cited by examiner

*Primary Examiner* — Anand Bhatnagar
(74) *Attorney, Agent, or Firm* — Rothwell, Figg, Ernst & Manbeck, P.C.

(57) ABSTRACT

The method of processing postal items comprises the following steps: causing the postal items to advance in series past a camera (120) for the purpose of generating an image (1) of one face of each postal item, which face bears postal address information; filtering the image of a current postal item for the purpose of isolating, in the image, at least one region of interest (ROI) containing the address information; and sending the filtered image to an automatic recognition unit (130) for automatically recognizing postal addresses by means of OCR so as to extract the postal address from said filtered image and so as to direct the current postal item to a sorting outlet. In order to construct a filter mask, the method further comprises causing a card (20) of the "separator" type to advance past the camera (120), which card has a face on which said region of interest (ROI) is represented.

12 Claims, 2 Drawing Sheets

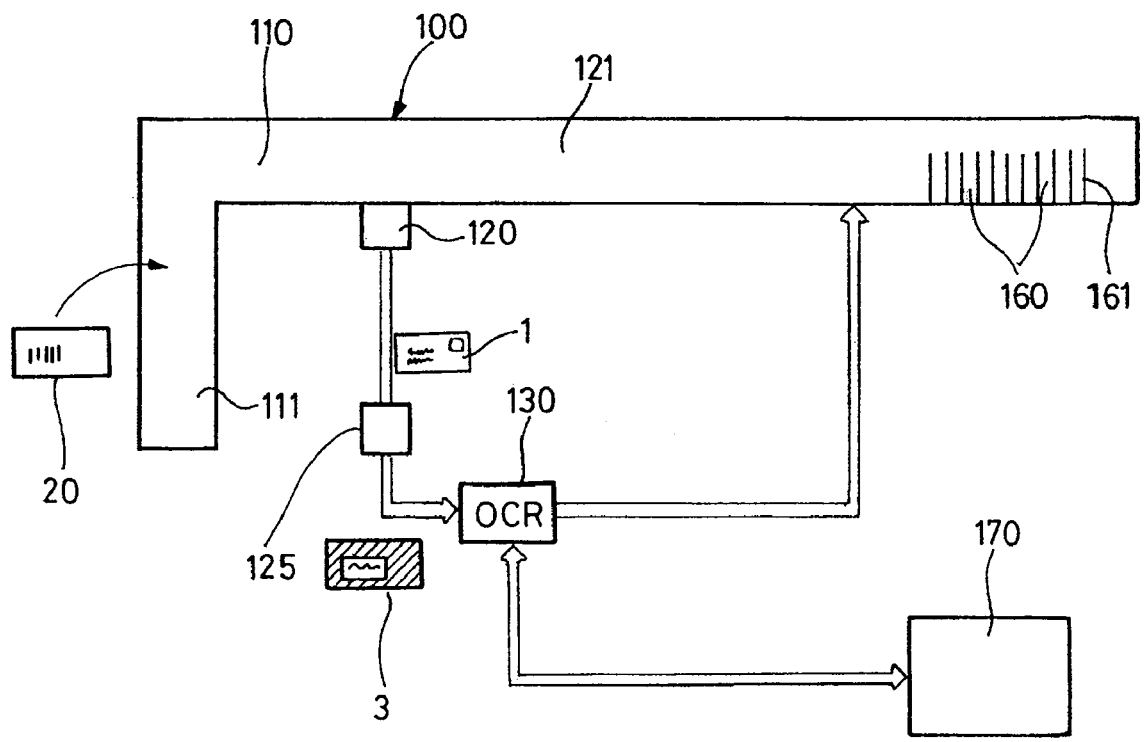
FIG_1
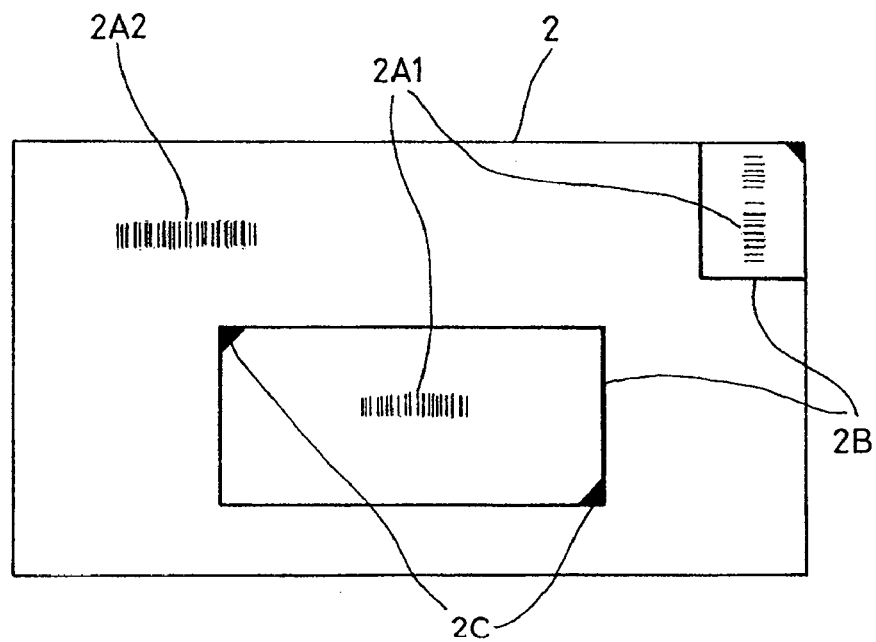
FIG_2

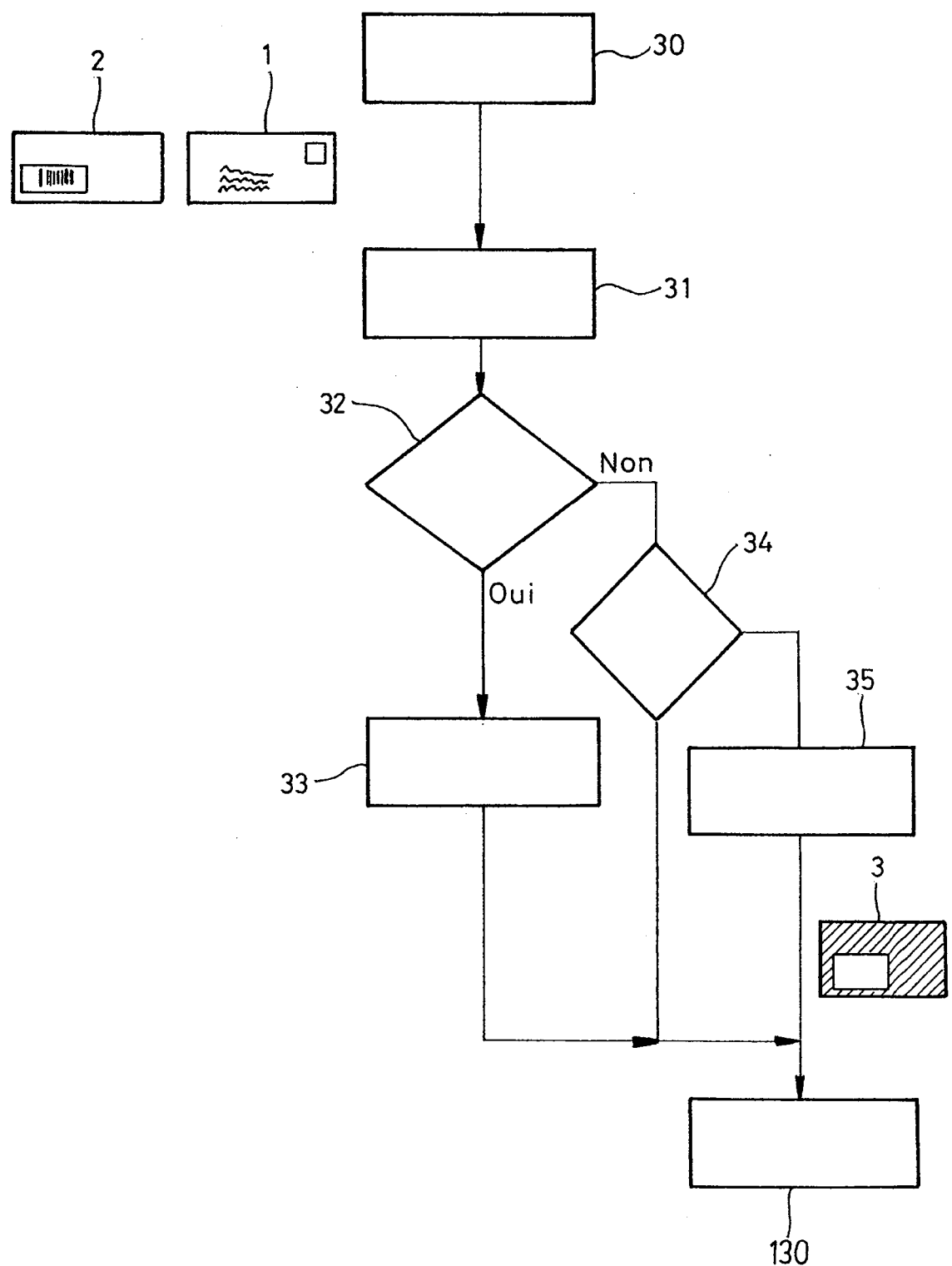

METHOD OF PROCESSING POSTAL ITEMS USING A SEPARATOR REPRESENTING A REGION OF INTEREST (ROI)

CROSS REFERENCE TO RELATED APPLICATIONS

This application is a 35 U.S.C. §371 National Phase Application from PCT/FR2007/051562, filed Jun. 29, 2007, and designating the United States, which claims the benefit of France Patent Application No. 0654225, filed Oct. 12, 2006.

BACKGROUND OF THE INVENTION

1. Field of the Invention

The invention relates to automatically processing batches of postal items such as letters, large-format flat items or "flats" (e.g. magazines or newspapers in plastic or paper wrappers), or indeed parcels.

The invention relates more particularly to a method of processing postal items that consists in causing the postal items to advance in series past a camera for the purpose of generating an image of one face of each postal item, which face bears postal address information, in filtering the image of a current postal item for the purpose of isolating, in the image, at least one region of interest (ROI) containing the address information, and in sending the filtered image to an automatic recognition unit for automatically recognizing postal addresses by means of Optical Character Recognition (OCR) so as to extract the postal address from said filtered image and so as to direct the current postal item to a sorting outlet.

2. Discussion of the Background Art

OCR is a well-known image-processing technique in which images are recorded with suitable resolution and machine-recognizable symbols (in particular letters and numerals) are extracted from the images and are then evaluated. Modern OCR systems for automatically recognizing postal address information such as a postal delivery address can achieve processing throughputs of several tens of thousands of postal items per hour. However, the reliability of the recognition can vary considerably as a function of the writing style with which the address information is written on the postal items and also of the quantity of information appearing on the postal items. When the address information can be recognized automatically and unambiguously by OCR, the postal item corresponding to said address information can be directed automatically to a sorting outlet. Otherwise, the image of the postal item must be sent to a video coding system while the postal item itself waits to be sorted, which increases the processing costs for the postal operator.

Frequently, for a batch of postal items (for bulk mailing), the delivery addresses on the postal items are located at the same place on the face of each of the postal items, but that face also bears other address information such as the address of the sender of the postal item. In which case, automatic recognition cannot succeed because multiple addresses are present on the face of each of the postal items. It is possible to superpose a filter mask on the image generated for each postal item by the camera, in order to isolate one or more regions of interest (ROIs) in the image of the postal item, in which region(s) the relevant postal address information (in particular the postal delivery information) is situated, thereby contributing to reducing the recognition error rate.

After filtering, the image that is sent to the OCR automatic recognition unit is, for example, a blank (white-background) image (i.e. an image of the background of the mask) inside which appears, in a rectangle, only the delivery address block (i.e. a region of interest), e.g. in the form of gray-scale pixels of the original image generated by the camera. The filter mask can be more sophisticated in that it leaves visible, in gray scale, a plurality of distinct rectangular zones including postal address information. It is possible to provide ROI filtering that is different for different inlet lines of a sorting machine.

3. Description of the Related Art

Document U.S. Pat. No. 6,665,422 teaches using a video coding station for defining a region of interest. When a postal item image generated by the camera cannot be evaluated unambiguously by the OCR recognition unit, that image is displayed on the screen of a video coding station as superposed with a grid. The position in the image of the address block containing the address information is specified by the video coder which enters position data by using the grid, that position data then being delivered to the OCR recognition unit. That method of defining a region of interest can be implemented only for postal items processed in time-shifted manner.

Patent Document EP 0 596 724 also discloses a method of scanning a document containing a plurality of pages, that method consisting in reading a code on a separator placed at the beginning of the document. That code indicates the region to be scanned or "region of interest". Unfortunately, Patent Document EP 0 596 724 does not make it possible to perform real-time automatic sorting or merely to update the region of interest.

SUMMARY OF THE INVENTION

An object of the invention is to propose a method of defining at least one region of interest, which method can be implemented while the postal items are being automatically sorted in real time, in particular a method as defined above in which a filter mask is used to deliver a filtered image to the OCR recognition unit but which is improved so that the mask is easier to construct.

Another object of the invention is to propose such a method that makes it possible to avoid manipulation errors made by the machine operators during activation of the image filtering, and in particular that avoids having the filter mask parameters input manually on a keyboard by the machine operators.

Another object of the invention is to propose such a method that makes it possible to change the characteristics of the filter mask while a stream of postal items is flowing through the machine, without interrupting the inlet flow into the machine.

To these ends, the invention provides a method of processing postal items, which method consists in causing the postal items to advance in series past a camera for the purpose of generating an image of one face of each postal item, which face bears postal address information, in filtering the image of a current postal item for the purpose of isolating, in the image, at least one region of interest containing the address information, and in sending the filtered image to an automatic recognition unit for automatically recognizing postal addresses by means of OCR so as to extract the postal address from said filtered image and so as to direct the current postal item to a sorting outlet, said method being characterized in that it further consists in causing a card of the "separator" type to advance past the camera, which card has a face on which the boundary of said region of interest is represented graphically, so as to construct a filter mask.

Advantageously, in accordance with the invention, a separator on which the boundary of the region of interest is represented graphically makes it unnecessary to use a memory or a database containing the postal item formats, and thus unnecessary to update such a database. Furthermore, the method is not interrupted due to accessing such a memory. Finally, the senders of the postal items can themselves print out and update their separators with the regions of interest positioned correctly.

In accordance with the invention, a card of the "separator" type having a face on which one or more regions of interest are represented graphically is caused to advance past the camera in order to construct a filter mask. The "filter mask" is used herein broadly to designate information data for performing graphic filtering in an image with one or more portions of the image being masked. With the method of the invention, in order to change the filter parameters for filtering the images, it is thus merely necessary to insert a new "filter card" into the inlet of the sorting machine, which new card represents the new regions of interest, at the head of the batch of postal items to whose images the new image filtering is to be applied. The new filtering parameters can consist both in activating the filtering and also in deactivating the filtering depending on the manner in which the region(s) of interest is/are represented on the "filter card". A plurality of different "filter cards" can easily be inserted successively by the machine operator as the postal items to be sorted are fed into the inlet of the machine.

In a particular implementation of the method of the invention, a portion of the outline of said region of interest is represented by a rectangle.

In a particular implementation of the method of the invention, a portion of the outline of said region of interest is represented by two corners of a rectangle.

The method of the invention for processing postal items can, in particular, present the following features:
- a search is made in the image generated by the camera for the presence of a specific code indicating that said image is the image of a card of the "separator" type on which at least one region of interest is represented;
- if the presence of said specific code is detected in said image, a search is made in said image for a rectangular outline that surrounds said specific code;
- a bar code is used as the specific code;
- it is determined whether said specific code identifies the zone lying within the rectangle as being a zone to be included in or a zone to be excluded from the filter mask; and
- it is determined whether said zone has a relative position or an absolute position in the image.

The invention also provides a postal sorting machine including a camera for generating an image of one face of a postal item, which face bears postal address information, and an automatic recognition unit for automatically recognizing postal addresses by means of OCR, which unit extracts the address information from said image so as to direct the postal item automatically to a sorting outlet corresponding to said postal address, said postal sorting machine being characterized in that it further includes an image processing unit which is interposed between the camera and the recognition unit, and which is arranged so that:
- it detects the presence of a specific code in the current image generated by the camera, which code indicates that said image is the image of a "separator-type", card on which the boundary of at least one region of interest is represented graphically; and
- in response to such detection, said image processing unit constructs, in a memory of the machine, a filter mask corresponding to said region of interest, applies filtering to an image subsequent to the current image generated by the camera by superposing said filter mask on the subsequent image so as to form a filtered image in which said region of interest is isolated, and sends said filtered image to the recognition unit.

BRIEF DESCRIPTION OF THE DRAWINGS

The method and the machine of the invention can be better understood on reading the following description of an implementation and of an embodiment that are shown in the drawings, in which:

FIG. 1 is a diagrammatic view of a sorting machine for implementing the method of the invention;

FIG. 2 is a view of a "filter card" of the invention; and

FIG. 3 is a flow chart showing the various steps of the method of the invention.

DETAILED DESCRIPTION OF THE PREFERRED EMBODIMENTS

FIG. 1 is a highly diagrammatic view of a postal item sorting machine 100 specially arranged for implementing the method of the invention.

The postal item sorting machine 100 includes an unstacker device 110 for unstacking postal items and putting them in series, which unstacker device takes the postal items from a storage magazine 111 of an inlet line where they are, for example, disposed on edge in a stack. At the outlet of the device 110, the series of on-edge postal items are successively brought past a camera 120 which takes an image 1 of one face of each postal item. The postal items are then conveyed through a time-delay zone 121 before being directed to sorting outlets 160.

While the postal items are flowing through the time-delay zone 121, the images 1 of the postal items are sent successively to an image processor unit 125 which can apply filtering to said successive images so as to generate filtered images such as 3 which are sent to an OCR postal address recognition unit 130 that extracts the postal address of the postal item from an image 3 and evaluates it so as to control the machine 100 in a manner such as to direct said postal item to a sorting outlet that corresponds to its postal address.

The OCR recognition unit 130 is generally also connected to a video coder system represented by the block 170 for time-shifted recognition of the postal address information on the postal items.

In the filtered image 3, an address information block, defined in this example by a rectangle, has been isolated from the rest of the image (shown by hatching and that can be in form of a white background) by superposition with a filter mask. The filtering operation that consists in superposing a filter mask on a postal item image is well known to the person skilled in the art and is not described in any further detail below.

In order to activate filtering of the invention on a region of interest in the unit 125, a card 20 of the "postal item separator" type having one face on which the region of interest is represented is inserted into the inlet of the machine 100, and more particularly into the postal item feed magazine 111. Said card 20 is therefore unstacked and presented facing the camera 120 so that an image is taken that, instead of bearing address information, bears a representation of a region of interest.

For the purpose of processing batches of postal items with prior filtering of a region of interest in each of the postal item images, the machine operator loads the postal items in a stack into the feed magazine 111, the first postal item in the stack however being preceded by the card 20 representing said region of interest. If the filtering is to be deactivated/modified in the unit 125 at the end of processing of the batch of postal items, the machine operator disposes another appropriate card 20 at the end of the stack of postal items. It is conceivable for the filtering also to be deactivated by a specific operator command from the workstation on the sorting machine.

Postal item separators are already used in sorting outlets for separating postal items belonging to different delivery rounds or "postman's walks". Said card 20 that serves to indicate a region of interest to the machine for automatic recognition purposes is in the form of a separator can be made of printable card reinforced with a plastics material. The card 20 can have the same size as a postal item to be processed in the machine 100.

In FIG. 2, the card 20 identifies two distinct regions of interest. In particular, the image of the card 20 shows two first bar codes 2A1 and one other bar code 2A2, the bar codes being, for example "128" bar codes of French Standard NF EN799, two of the three bar codes being surrounded by the outlines of respective rectangles 2B which correspond to two regions of interest in this example.

By way of example, and in order to enable the invention to be well understood, both of the bar codes 2A1 and 2A2 are specific codes that are recognizable by the processor unit 125. For example, the codes 2A are designed to indicate that the zone within the rectangular outline 2B that surrounds the specific bar code 2A1 is a zone to be included/isolated in the filtered image (i.e. said zone is not a filter zone in the filter mask) whereas the specific code 2A2 is designed to indicate that the zone that surrounds it, within the outline of the image in this example, is a zone to be excluded/filtered out in white in the filtered image (i.e. a filter zone in the filter mask).

A zone identified by a specific code 2A1 (inclusion code) is thus a non-filter zone, whereas a zone identified by a specific code 2A2 is a filter zone in the image to be filtered.

In practice, in the example shown in FIG. 2, the filter mask of the card 20 defines two distinct rectangular regions of interest (in the middle of and at the top right of the image) that correspond respectively to the region in which a delivery address is normally situated and to the region in which a postage mark is normally situated.

The size of the rectangular outlines 2B can be about 40 millimeters (mm) long and about 20 mm high. This representation by rectangles with associated specific bar codes thus makes it possible to define one or more distinct regions of interest. If a specific bar code such as 2A2 is associated with a zone to be excluded that overlaps a zone 2A to be included that is associated with another specific bar code such as 2A1, it is possible to make provision in the unit 125 for the filter mask to be constructed in a manner such that said zone to be included prevails over the zone to be excluded in the filtered image.

In addition, as shown in FIG. 2, in each of two corners of the rectangle in the middle of the image 2 and in one corner of the rectangle at the top right of the image 2, a sort of black triangle can be used as a symbol to identify in the unit 125 that the position of the rectangle in question is a relative position in the image (absence of such a symbol in a corner of the rectangle indicating that the position of the outline is an absolute position in the image). The term "relative position" is used to mean that the size of the outline of the rectangle in the filter mask must be dimensioned to the size of the image of the postal item to be filtered. It is also possible to use a convention whereby, depending on whether one or two corners of the outline are marked with such a symbol, the dimensioning acts on one side of the outline only or on both sides of the outline.

The filter card represented by 20 in FIG. 1 corresponding to the image of FIG. 2 can be made on a conventional printer by printing the outlines of the rectangles and the bar codes in black ink on a blank card that is completely white, for example. In order to deactivate image filtering completely, it is conceivable to use a card that is completely white and on which only a bar code such as 2A1 is printed, indicating that the zone surrounding it is a zone to be included in the filter mask.

FIG. 3 shows various processing steps performed in the unit 125.

In step 30, the unit 125 receives an image 1 generated by the camera 120.

In step 31, image analysis is used to search the image 1 for a specific code, such as the bar codes 2A, indicating that the image is the image of a "filter" card representing a region of interest (ROI).

If, in step 32, the presence of said specific code has been identified (i.e. if a card 20 has been inserted into the magazine 111 of the machine 100 and brought by the device 110 past the camera 120), image analysis is used in step 33 to perform a search for identifying a frame (outline) of one or more rectangles. Depending on the results of said search, at least one region of interest is determined as explained above, and a filter mask is constructed in a memory of the unit 125. The image of the "filter" card is not delivered to the OCR recognition unit 130, and a special command (analogous to a "separator" command) is returned to the sorting machine by the unit 125, thereby causing the card 20 to be directed to a sorting outlet 161 that is, for example, reserved for reject postal items.

If, in step 32, the presence of said specific code is not identified in the image, the processing continues, in step 34, with checking for a parameter indicating activation or deactivation of the ROI filter function (activation/deactivation of the filter mask recorded in the memory). If the filter function is activated at 34, the process continues, in step 35, with an operation of superposing the filter mask on the image 1 received at the inlet of the unit 125 so as to generate a filtered image such as the image 3 in FIG. 3. In the image 3, the hatched zone corresponds to a white image background. Said filtered image 3 is sent to the OCR recognition unit 130.

When, in step 34, the filtering is deactivated, the input image 2 is directly sent by the processing unit 125 to the OCR recognition unit 130.

The processing unit 125 which is interposed between the camera 120 and the unit 130 can be an integral part of the programmed circuits of the camera 120.

Following on from the invention, it is possible to make provision for the image of a "filter" card that is detected by the unit 125 to be displayed on a display screen for the purposes of being checked by the machine operator. In order to reinforce the manipulation error checking procedures, it is also possible, in the specific codes 2A of a "filter" card 20, to encode the code of the sorting machine on which the filter card is used, and, in step 33, to check that the machine number resulting from the code 2A is indeed the code of the machine on which the processing unit 125 is installed.

The method of the invention for activating/modifying/deactivating an ROI filter function on the images of the postal items offers the advantage of having no repercussions on operation of the OCR address-recognition unit 130.

The invention claimed is:

1. A method of processing postal items, which method comprises the steps of (a) causing the postal items to advance in series past a camera for the purpose of generating an image of one face of each postal item, which face bears postal address information, (b) filtering the image of a current postal item for the purpose of isolating, in the image, at least one region of interest (ROI) containing the address information, (c) sending the filtered image to an automatic recognition unit for automatically recognizing postal addresses by means of OCR so as to extract the postal address from said filtered image and so as to direct the current postal item to a sorting outlet, and (d) causing a card of the "separator" type to advance past the camera, which card has a face on which a boundary of said region of interest (ROI) is represented graphically, so as to construct a filter mask.

2. A method according to claim 1, in which at least a portion of an outline of said region of interest (ROI) is represented on the face of the "separator" type card.

3. A method according to claim 2, in which said portion of the outline of said region of interest (ROI) is represented by a rectangle.

4. A method according to claim 2, in which said portion of the outline of said region of interest (ROI) is represented by two corners of a rectangle.

5. A method according to claim 1, in which said filtering step is performed subsequent to said step of causing a "separator" type card to advance past the camera.

6. A method according to claim 1, further comprising the step of searching the image generated by the camera for the presence of a specific code indicating that said image is the image of a card of the "separator" type on which said region of interest (ROI) is represented.

7. A method according to claim 6, further comprising, if the presence of said specific code is detected in said image, the step of searching in said image for a rectangular outline that surrounds said specific code and that represents said region of interest (ROI).

8. A method according to claim 6, in which a bar code is used as the specific code.

9. A method according to claim 6, in which said searching step includes determining whether said specific code identifies the zone lying within the rectangle as being a zone to be included in or a zone to be excluded from the filter mask.

10. A method according to claim 9, in which said determining step further includes determining whether said zone has a relative position or an absolute position in the image.

11. A postal sorting machine comprising at least one sorting outlet, a camera for generating an image of one face of a postal item, which face bears postal address information, an automatic recognition unit for automatically recognizing postal addresses by means of OCR, which unit extracts the address information from said image so as to direct the postal item automatically to a sorting outlet corresponding to said postal address, a memory, and an image processing unit which is interposed between the camera and the recognition unit, and which is arranged so that said said image processing unit:

detects the presence of a specific code in the current image generated by the camera, which code indicates that said image is the image of a "separator-type" card on which a boundary of at least one region of interest (ROI) is represented graphically; and in response to such detection, said image processing unit constructs, in the memory of the machine, a filter mask corresponding to said region of interest (ROI), applies filtering to an image subsequent to the current image generated by the camera by superposing said filter mask on the subsequent image so as to form a filtered image in which said region of interest is isolated, and sends said filtered image to the recognition unit.

12. A postal sorting machine according to claim 11, in which the image processing unit is an integral part of said camera.

* * * * *